United States Patent [19]

Nolan, Jr. et al.

[11] 3,961,493

[45] June 8, 1976

[54] METHODS AND APPARATUS FOR PURGING LIQUID FROM AN OFFSHORE PIPELINE AND/OR SCANNING A PIPELINE INTERIOR

[75] Inventors: Clyde Earvin Nolan, Jr., Houston; John Paul Soland, Alvin; William Samuel Tillinghast, Humble, all of Tex.

[73] Assignee: Brown & Root, Inc., Houston, Tex.

[22] Filed: Jan. 22, 1975

[21] Appl. No.: 542,900

[52] U.S. Cl............................ 61/72.3; 15/104.06 A; 137/268
[51] Int. Cl.²........................ F16L 45/00; B08B 1/00
[58] Field of Search............................ 61/72.3, 72.1; 15/104.06 A; 137/268, 1

[56] References Cited
UNITED STATES PATENTS

| | | | |
|---|---|---|---|
| 2,796,878 | 6/1957 | Atkinson et al. | 15/104.06 A X |
| 2,953,158 | 9/1960 | Shea et al. | 15/104.06 A X |
| 3,125,116 | 3/1964 | Schaberg | 137/268 |
| 3,266,076 | 8/1966 | Surber | 15/104.06 A |
| 3,565,689 | 2/1971 | Lowe et al. | 15/104.06 A X |

Primary Examiner—Jacob Shapiro
Attorney, Agent, or Firm—James E. Cockfield

[57] ABSTRACT

Apparatus and methods for purging water from a submerged pipeline including means for handling pipeline "pigs" (i.e., sphere, plug, or other device movable through a pipeline interior in sliding peripheral engagement therewith). In the system of the invention a pig launcher is attached at a first pipeline means end and a pig receiver is attached at a second, submerged pipeline means end. The pig launcher is operable to propel a plurality of pig elements in sequence through the pipeline under the urging of pressurized gas in order to displace fluid and/or locate obstructions. The pig receiver is arranged to exhaust such displaced fluid and receive and store the propelled pig elements. The pig receiver may include a fluid discharge system for exhausting propulsion gas into the ambient water in response to the arrival of a pig element and thus provide means to signal such arrival. The pig launcher may include a fluid discharge system for exhausting pressurized propulsion gas into the ambient water to signify a successful pig launch.

28 Claims, 7 Drawing Figures

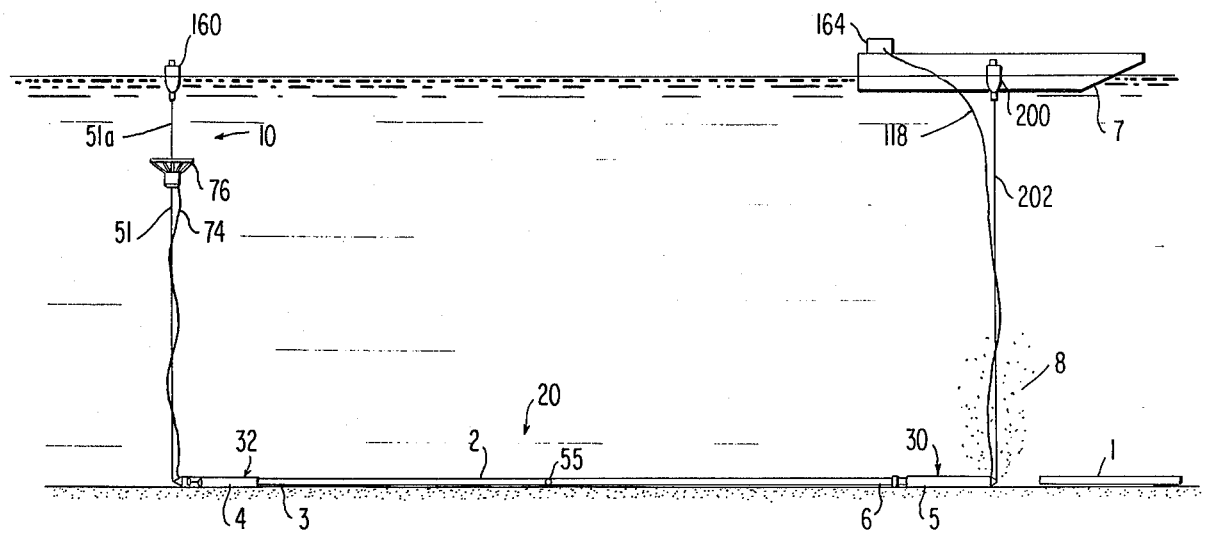
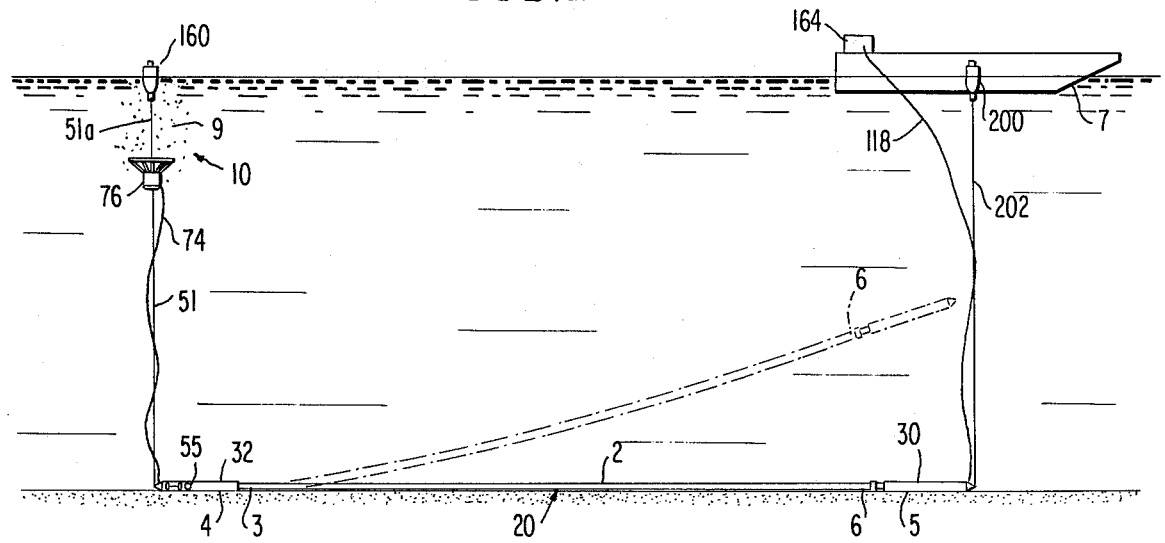

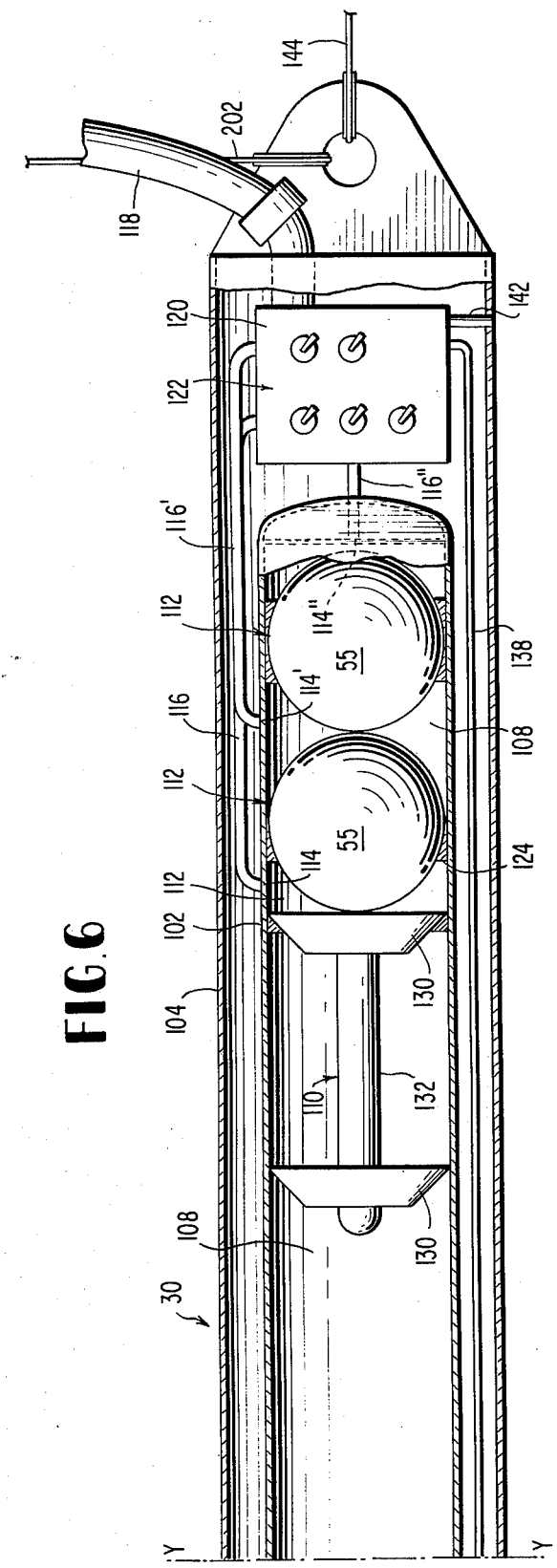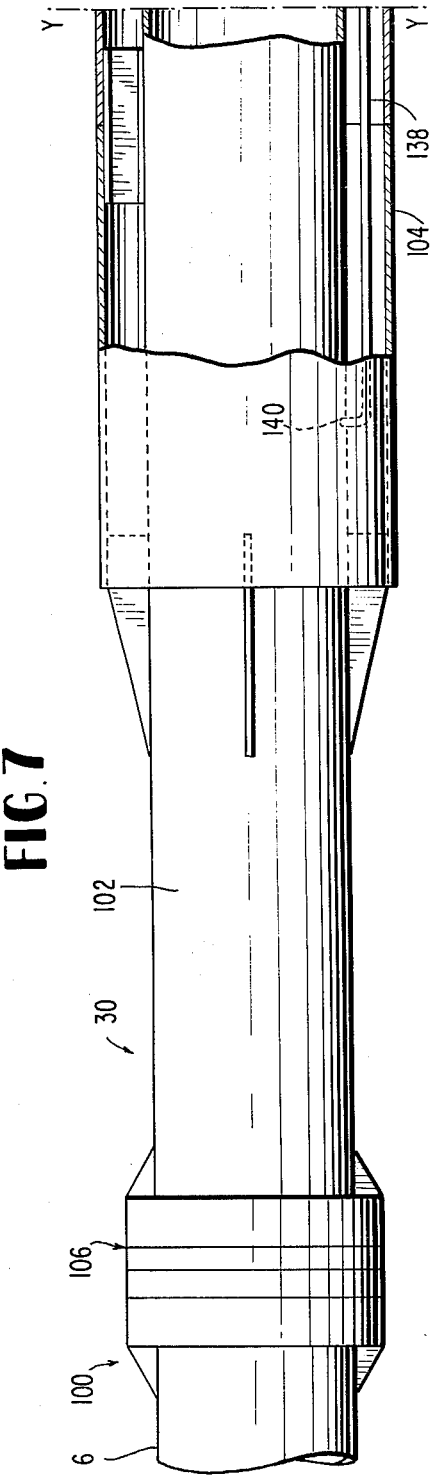

METHODS AND APPARATUS FOR PURGING LIQUID FROM AN OFFSHORE PIPELINE AND/OR SCANNING A PIPELINE INTERIOR

BACKGROUND AND OBJECTS OF THE INVENTION

The present invention relates to offshore pipeline laying operations and, more specifically, to methods and apparatus for purging the interior of a submerged pipeline and/or scanning a pipeline interior for obstructions or defects.

In performing conventional pipeline laying operations, a pipeline is suspended between a floating lay barge and the water bottom and the barge is advanced while paying out the pipeline. As the pipeline descends through the body of water, proper pipeline profile control must be maintained to keep the radius of curvature of the pipeline below its elastic bending limit. In the absence of sufficient profile control, overstressing of the pipeline can occur, resulting in the formation of cracks, buckles, and even ruptures in the pipeline.

In order to maintain proper profile control, dynamic tensioner units, stinger structures (i.e., pivoted, buoyant ramps), and other well-known pipeline supporting systems are in wide use (see, for example, U.S. Pat. No. 3,390,532 to Lawrence, issued July 2, 1960). However, such equipment may not always prevent overstressing of a pipeline during laying operations, particularly when rough seas are encountered. As a consequence, the formation of buckles or ruptures during offshore pipelaying operations sometime occur.

When a rupture occurs in a pipeline during a laying operation, the operator on board the pipeline lay barge may detect the presence of the rupture by noticing the increase in pipeline weight caused by flooding of the pipeline interior through the rupture. The presence of a rupture or buckle may also be detected through the use of a buckle detecting apparatus as disclosed, for example, in U.S. Pat. No. 3,739,591 to Jones, issued June 19, 1973, assigned to the assignee of the present invention and the disclosure of which is herein incorporated by reference.

When such a rupture or buckle has been detected, it is necessary to remove the damaged submerged portion of the line and continue laying operations.

After the damaged portion of the line has been removed (possibly by use of divers) the undamaged previously-laid pipeline portion needs to be reconnected with pipeline means being supplied from the lay barge so that the laying operation may continue.

This reconnection may be effected by raising a portion of the undamaged previously-laid pipeline up to the lay barge where it may be connected with the pipeline being supplied by the pipeline feeding means of the lay barge.

One technique for effecting such a repair operation is disclosed in U.S. Pat. No. 3,751,932 to Matthews (issued Aug. 8, 1973). The Matthews technique entails the purging of water from the pipeline portion to be raised through the use of a pipeline pig. A pipeline pig constitutes a sphere, plug, or other device which is movable through the interior of a pipeline in slidable peripheral engagement with the pipeline interior.

The Matthews technique contemplates a calculation of the amount of displacing fluid acting on the purging pig so as to enable an operator to determine the length of the purged portion of the pipeline requisite to the raising operation, i.e., a minimal portion only of the laid line is purged.

The present invention constitutes an improvement in relation to the Matthews repair technique in that a previously-installed pig receiving receptacle is utilized so as to eliminate the uncertainties and calculations attendant upon the Matthews partial purging technique.

Moreover, the present invention enables multiple pig elements to be sequentially passed through a submerged pipeline portion to achieve optimum purging or to achieve a multiplicity of pigging functions (i.e., checking the interior of the pipeline to insure it is free from buckles, purging, etc.).

In addition, the present invention contemplates a possible utilization of "telltale" or "tattletale" indications of successful pig launching and the ultimate positioning of pipeline pigging elements.

Further, the present invention is applicable to pigging operations where inspection of the pipeline interior—as opposed to repairing only—is involved.

It will also be appreciated that aspects of the invention involving pig receiving may be practiced where the launching of a pig is effected either from a submerged location or from a floating vessel and regardless of where a damaged pipeline section is removed (i.e., at a submerged site or on board a vessel).

Such improvements in the art and other disadvantages are attained through the present invention, particularly in relation to the preferred embodiments which will now be described.

BRIEF SUMMARY OF A PREFERRED EMBODIMENT OF THE INVENTION

The present invention concerns methods and apparatus for passing pigs from a first pipeline means end to a second, submerged, pipeline means end. A pig launcher unit is attached to the pipeline at the first pipeline means end. The pig launcher unit contains at least one pig element and a mechanism for injecting pressurized gas behind the pig element to propel it through the pipeline. A pig receiver unit is attached to the pipeline at the second, submerged pipeline end. The pig receiver unit is arranged to exhaust fluid which may be displaced by the pig element to receive the propelled pig element.

The pig launcher and receiver can be arranged to launch and receive a plurality of pig elements which may be propelled sequentially, and at intervals as desired, through the submerged pipeline.

In another significant aspect of the invention, the pig receiver unit may be arranged to exhaust pressurized propelling gas into the ambient water to indicate the arrival of the pig element within the pig receiver unit. Pressurized gas may also be discharged from the pig launcher unit to signal a successful launching.

In yet another aspect of the present invention, displaced liquid being exhausted from the pig receiver unit can be exhausted through diverse outlets of the pig receiver unit so as to permit a rapid passage of sequentially launched pigs.

Also of significance, a pig handling unit of this invention can be made convertible between pig launching and pig receiving modes of operation.

THE DRAWINGS

Objects, advantages, and significant aspects of the present invention will become apparent from the subsequent detailed description of preferred embodiments which will be accomplished with reference to the accompanying drawings.

In these drawings:

FIG. 1 schematically depicts, in an elevational format, the launching of a pig through a submerged pipeline portion;

FIG. 2 schematically depicts, in an elevational format, the receiving of the pig which was launched in the FIG. 1 illustration;

FIG. 6 is a view, partially in longitudinal section, of one end of a pig launcher unit according to the present invention; and FIG. 7 is a view, partially in longitudinal section, of the other end of the pig launcher unit depicted in FIG. 6, these two ends being joined along line Y—Y.

DETAILED DESCRIPTION OF PREFERRED EMBODIMENTS

Figure 3:
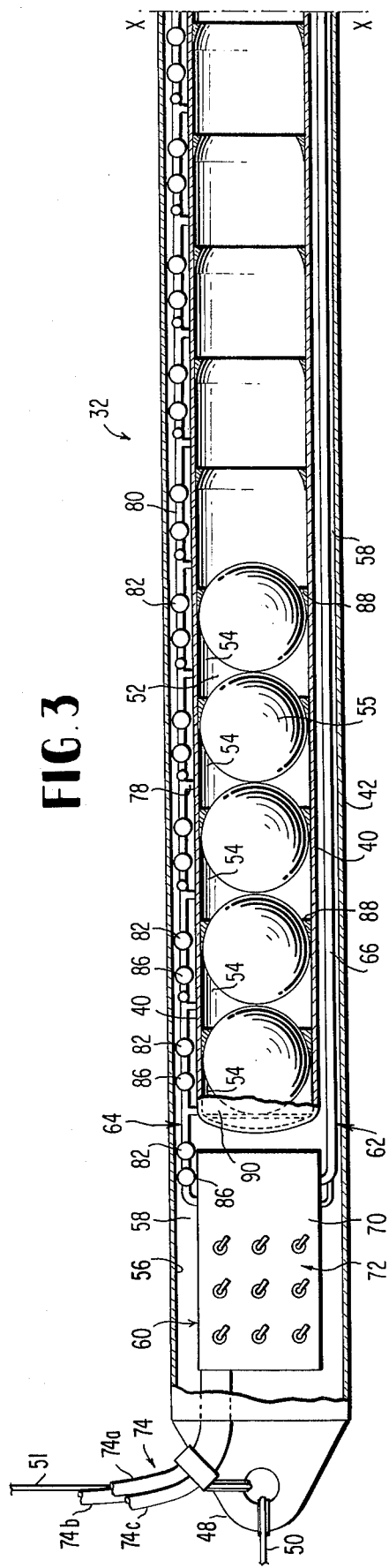
FIG. 3 is an enlarged view, partially in longitudinal section, of one end of a pig receiver unit according to the present invention.

The present invention is directed in particular to the use of a pipeline receiving receptacle or receiving unit which is installed on the initial end of an offshore pipeline, preferably on the pipeline lay barge at the commencement of the pipeline laying operation.

The invention is also concerned with a system combination entailing such a pipeline pig receiver and a pipeline pig launching unit which are operable to sequentially launch and receive a plurality of pipeline pigging elements.

Before describing structural and operational details of such pig receiving and pig launching units, brief mention will be made of a representative overall context within which the invention would be practiced.

Context of Invention

FIGS. 1 and 2 generally depict a representative context within which the present invention could be practiced. This context involves the repairing of a damaged, submerged pipeline portion.

As shown in these Figures, a damaged pipeline section 1 has been removed by divers from an initially laid pipeline portion 2.

At the commencement end 3 of the initially laid pipeline portion 2 a pig receiving unit 4 is provided. This pig receiving unit 4 may have been installed on a pipeline lay barge at the commencement of pipeline laying operations (or conceivably may have been installed by divers after the pipeline portion 2 was laid).

A pipeline pig launching unit 5 is attached to the free end 6 of the initially pipeline laid portion (i.e., the end adjacent the previously removed damaged section 1).

FIG. 1 depicts the launching of one or more pigging elements from the pig launching unit 5 through the use of compressed gas supplied from a floating vessel 7. An indication of this launching of pigging units or elements may be provided by a telltale ejection 8 of pressurized gas from the launching unit 5, as depicted schematically in FIG. 1.

FIG. 2 depicts the successful arrival and "socketing" of a pig element in the pig receiving unit 4. An indication of the successful arrival of a pigging element in pig receiving unit 4 may be provided by a telltale emission 9 of propelling gas issuing from a submerged buoy unit 10 associated with the pig receiving unit 4.

After one or more pig elements have been successfully launched from the launching unit 5 and received by the pig receiving unit 4, the initially laid pipeline portion 2 is in a condition to be reconnected with pipeline means at a pipeline feeding station on a pipeline lay barge.

As will here be recognized, this conditioning of the pipeline portion 2 for reconnection with a continuing supply of the pipeline may have involved purging of the pipeline portion of water through the passage of one or more water purging pigs through the interior of the pipeline portion 2. Additionally, this conditioning of the pipeline portion 2 for subsequent laying operations may also have entailed the scanning of the interior of the pipeline portion 2 by a scanning or "caliper" pig to insure the absence of other imperfections such as buckles, etc.

In any event, after the pipeline portion 2 has been appropriately conditioned by the desired pigging operations, the end portion 6 may be raised to a pipeline lay barge (as depicted by the phantom line showing of FIG. 2) where the pig launching unit 5 will be removed and the pipeline end 6 connected with the succeeding pipeline portion to be laid.

Techniques for effecting the raising of a thus purged pipeline portion are well known in the art and need not be redescribed at this juncture.

With a representative context of the invention having been described, it is now appropriate to consider structural and operational details of preferred forms of the pig receiver unit 4 and the pig launcher unit 5.

For reference purposes the line section 2, pig launcher 5 and pig receiver 4 may be considered as a pigging assembly 20.

Figure 4:
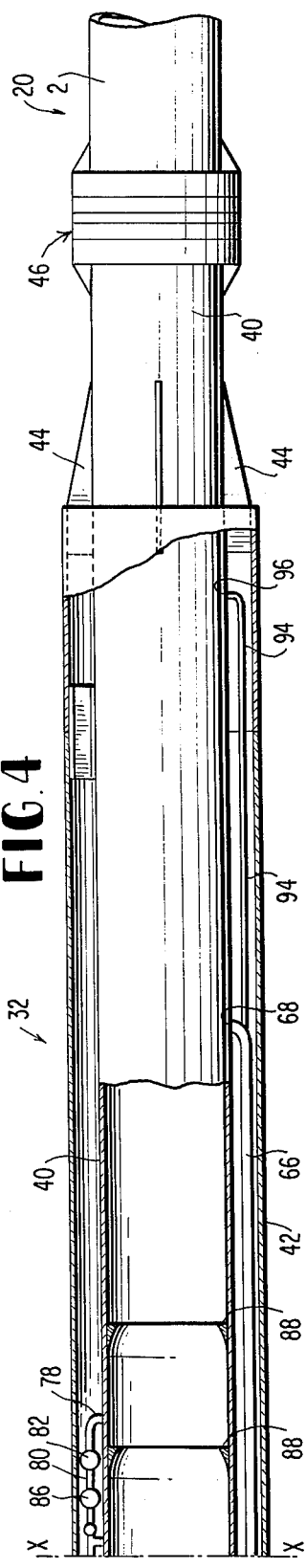
FIG. 4 is a view, partially in longitudinal section, of the other end of the pig receiver unit shown in FIG. 3, the two ends being joined at line X—X.
Figure 5:
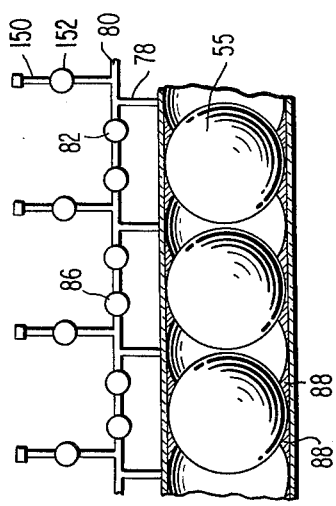
FIG. 5 is a fragmentary, longitudinal sectional view of an alternative embodiment of a pig receiver unit of the present invention.

In describing preferred embodiments, the launcher 5 will be described in relation to an embodiment 30 depicted in FIGS. 6–7 and the receiver 4 will be described with reference to embodiment 32 depicted in FIGS. 3 and 4 (a modification of which is shown in FIG. 5).

Pig Receiver Unit

The pig receiver 32 is preferably located at the initially laid end of the pipeline, it having been installed there at the commencement of the laying operation. This installation may be effected on the pipelaying vessel itself.

As is best disclosed in FIGS. 3 and 4, the pig receiver 32 includes a cylindrical tube 40 which may be arranged concentrically within an outer cylindrical shroud 42. The tube 40 and shroud 42 may be rigidly concentrically connected in any suitable manner, such as by braces 44 welded therebetween. The tube is detachably affixed to the initial pipeline end 3 at 46 so as to be placed in communication therewith. Such a connection can be established by a flange coupling 46 of the type described in U.S. Pat. No. 3,603,617 to Lochridge, issued Sept. 7, 1971, or by other couplings or connections (see, for example, U.S. Pat. No. 3,645,563 to Rochelle, issued Feb. 29, 1972).

The forward end of the shroud includes an anchor bracket 48 to which a draw cable 50 may be attached for assisting in the initial pipeline laying steps via techniques now well known in the art.

The interior of the tube 40 defines a pig receiving compartment 52 which is axially aligned and communicable with the pipeline 2. The compartment includes a plurality of stations 54, operable to receive a plurality of pig elements, such as spherical pig elements 55, for example.

The tube 40 is spaced from the inner wall 56 of the shroud 42 to define a protected chamber 58 therebetween for the reception of a fluid conduit system 60. Included in this system are primary and secondary fluid conduit systems 62 and 64, respectively.

The primary conduit system 62 includes a primary fluid conduit 66 having an inlet 68 (FIG. 4) which communicates with the compartment 52 at a location disposed ahead of the pig receiving stations 54. The primary conduit 66 communicates with a master control unit 70 which may be integral with unit 32. This control unit includes valving elements which can be manually actuated by valve controls on a panel 72 to communicate the primary conduit 66 with a discharge line 74a which may comprise a portion of a flexible conduit "bundle" 74. The line 74a may extend upwardly to and be connected to a submerged control station buoy 76 (FIG. 2) of buoy assembly 10 and be arranged to expel fluid there directly into the surrounding or ambient water. Buoy 76 may be connected with unit 32 via a cable 51. A floating marker buoy 160 may be connected with buoy 76 via cable means 51a.

The discharge line 74a defines a discharge end of the primary conduit system 62.

The secondary fluid conduit system 64 includes secondary conduits 78 opening into the compartment 52 at each pig receiving station 54. Each of the secondary conduits 78 provides fluid communication with a main manifold assembly 80. The main manifold assembly 80 communicates with the master control unit 70. By appropriate manipulation of valving apparatus in control unit 70, fluid may be conducted from the main manifold assembly 80, into a discharge line 74b of bundle 74 and pass directly into the surrounding water at buoy 76. In this fashion, it will be appreciated that the discharge line 74b also defines a discharge end of the secondary conduit system 74.

Desirably, remotely operable controls for the valves of control unit 70, which may be diver actuated, are located on buoy 76. Such remote controls could also be located on a floating vessel. However, the control panel 72 is diver accessible through a hole cut in the shroud and the valve controls thereon may be manipulated by a diver. Additional control of fluid travel from individual ones of the pig receiving stations 54 is afforded by manually and/or remotely operable shut-off valves 82 arranged in the main manifold assembly 80. These valves 82 are also accessible to manual diver operation through suitable openings in the shroud. One-way check valves 86 are located in the main manifold assembly 80 between adjacent pig receiving stations 54 to limit the flow of fluid to a direction away from the stations 54.

At each of the individual pig receiving stations 54, there may be located one or more "rings" 88 which may be wedge shaped in cross section and which may be annular or segmental in character (i.e., may be rings as such or other detent devices). These wedge rings are capable of holding a spherical pig element in place, yet allow a pig to deform and pass resiliently therethrough under sufficient pressure urging. As shown in FIG. 3, one wedge ring may be provided in each compartment at the compartment end facing the pipeline 2. As shown in FIG. 5, a pair of "nesting" wedge rings or other restraining means may be provided in each compartment 54.

As a pig 55 advances through the pipeline toward the receiver, water located thereahead is displaced through the pipeline toward the pig receiver. In such instance, the conduits 66 and 80 are connected to the discharge lines 74a and 74b, respectively. Most of the water being displaced enters the inlet 68 and is ejected into the surrounding water at buoy 76 and can be detected by a diver as an indication of pig movement. In such a mode of operation, the conduit 66 constitutes a primary fluid discharge conduit.

When the advancing pig 55 enters the receiver and passes the open inlet 68 of the primary discharge conduit 66, the inlet 68 is placed in communication with the pipeline 2 and that portion of the compartment 52 located behind the pig. Pressurized propulsion gas which is being utilized to propel the pig is thus admitted into the primary discharge conduit 66, and if the control valve associated with conduits 66 and 74a is open, this gas is expelled into the surrounding water at buoy 76. Expulsion of such significant quantities of gas into the water produces a highly detectable tattletale or telltale signal 9 of bubbles (FIG. 2). These bubbles 9 are immediately indicative to a diver observer of the arrival of the pig at the receiver.

After the advancing pig 55 passes the inlet 68 of the primary discharge conduit 66, it can continue to displace water thereahead. This water is ejected through the secondary fluid conduit system 64. In this mode of operation, the secondary conduit system 64 constitutes a secondary fluid discharge conduit system.

Subsequent pig elements 55 can be sent through the pipeline 2 to remove residual water or perform other pigging functions. These additional pig elements enter the receiver in the manner discussed above and are easily accommodated within the multi-stationed receiver.

It will be appreciated that the pig receiver can be arranged to receive a relatively large number of pigs, sufficient, for example, for a plurality of repair and dewatering and/or scanning operations that may be required during the overall pipeline laying procedure.

Once the pipeline 2 has been successfully laid, the pig receiver 32 can be disconnected at detachable coupling 46 from the initial pipeline end 20 for use in other operations. In this fashion, all of the pig elements, conveniently stored within their respective stations can be hauled as a unit to the surface for further use, absent the need for severing the end of the pipeline itself, or extracting pig elements from within the pipeline. Prior to this removal operation, the interior of the pipeline may be flooded, possibly via conduit system 62, to avoid a pressure differential which could make the disconnecting operation hazardous.

The pig detecting feature of the invention can be modified so as to provide an indication of pig presence at various locations in the receiver compartment 52. For example, a tattletale or telltale line 94 (FIG. 4) can be provided as a part of the primary discharge means, with its inlet 96 placed in communication with the compartment 52 at a location ahead of the dicharge conduit inlet 68. When an advancing pig element passes the tattletale inlet 96, propulsion gas is ejected through the tattletale line 96 and may pass through a valve in unit 70 to a flexible riser conduit 74c in bundle 74. The valve controlling flow between conduits 94 and 74c may be actuated by a diver via a valve control unit 70 or be remotely actuated by a diver at buoy 76. The presence of gas bubbles 9 in the expelled water provides advance notice of pig arrival.

At this point, it is appropriate to summarize and review certain operational aspects of the primary and secondary dicharge systems and the "tattletale" system.

The discharge conduit 66 of the primary discharge system 62 is of relatively large flow capacity in relation to the discharge conduit 80 of the secondary discharge system 64.

Thus, under the control of the valve means, which may be located in control unit 70, primary discharge conduit 66 may be placed in communicating relationship with the relatively large conduit 74a included in conduit bundle 74. Likewise, the relatively smaller sized conduit 80 may be placed in communicating relationship with a relatively small conduit 74b in conduit bundle 74 by way of appropriate valve means in control unit 70.

Likewise, tattletale conduit line 94 may be placed in communicating relationship with a conduit 74c included in conduit bundle 74 by way of appropriate valve means in control unit 70.

As will be understood, all of the conduit 74a 74b and 74c will extend up to the buoy 76.

With this arrangement, a diver at buoy 76 will be able to detect the arrival of a pig at the tattletale line outlet 96 by noticing the bubble formation 9. When this bubble formation is noted, the diver may operate the remote control valve means (conventional in nature) at the buoy 76 and close the valve in control unit 70 which places primary conduit 66 in communication with riser conduit 74a. Closing the valve of the primary conduit system in this manner will prevent the excessive loss of pressurized gas through the relatively large size primary discharge system 62 prior to the time that the pig is fully seated in one of the stations 54. However, as will be understood, this valve closing may not be completed before some air passes into the primary conduit system 62–74a.

After the primary discharge system is valved to a closed condition, a pig will continue to move into the receiving unit 32 under the influence of pressurized gas and will come to rest in one of the receiving stations 54.

Desirably, each pig 55 transmitted to the receiving unit 32 will move to the farthest most, unoccupied station 54 before coming to rest. The likelihood of this occurring may be enhanced by a diver opening only the valve 82 associated with the innermost available station 54 operable to receive a pig 55.

Even if the pig 55 should not move fully into the pig receiving unit, i.e., if it should stop at one of the outer available stations 54, subsequent pigs, upon arriving at the receiving unit 32 will engage the earlier transported pig and force it deeper into the unit 32, i.e., force it into one of the further located stations 54.

While a variety of valve manipulation techniques are possible, preferably under the control of a diver at buoy 76 (or alternatively under the control of a diver at control station 70), it is contemplated that at least after the pig receiving operation is completed, each of the conduit systems 62, 64 and 94 would be closed by actuating appropriate valves in the control unit 70 so as to "close in" the end of the assembly 20 containing the pig receiving unit 32.

As to repeated pig receiving operations, it will be understood that when a new pig is launched from the unit 30, the primary conduit system 62, the tattletale conduit system 94 and at least the portion of conduit 80 communicating with the farthest most station 54 (and possibly others upstream of this location) would be valved, to an open condition.

While the system has been described with respect to discrete or separate conduit 74a, 74b, and 74c, under certain circumstances it may be sufficient for all of the conduit system 62, 64 and 94 to discharge into a common single conduit, either discharging directly into the ambient water adjacent unit 32 or preferably extending up to and discharging at the buoy 76 or possibly extending to a location at the water surface.

As will be appreciated, the arrangement above described permits the sequential launching and receiving of multiple pig elements.

Moreover, the relatively large capacity of primary conduit system 62 enables a desirably rapid movement of pigs to occur during the bulk of the pig transporting operations, while the secondary conduit system 64 permits sequential seating or socketing of multiple pigs in stations 54 downstream of the primary system inlet 68. One consequence of this system may be that the relatively low flow capacity of the secondary system will tend to somewhat retard or slow the pigs during their final increment of movement into the receiver 32. If it should be determined that it would be desirable to slow, retard or "brake" the passage of pigs during such a final increment of movement, the valve means 82 may be appropriately operated to regulate discharge flow through the system 80 and thereby control the fluid displacing speed of the pigs 55.

Pig Launcher Unit

In order to launch pig elements, the pig launcher unit 30 is installed at the distal end 6 of the pipeline 2 (FIG. 3).

The pig launcher 30 is best shown in FIGS. 6 and 7 and includes a tube 102 that may be located within an outer shroud 104. The shroud 104 may be rigidly connected to the tube 102 so as to be located concentrically therearound. The tube 102 is suitably coupled at 106 to the exposed end of the pipeline 2 by suitable connecting means which can be of the types mentioned previously in connection with the pig receiver 32.

The tube 102 defines a compartment 108 which is aligned with the pipeline interior. Through this compartment 108, the pig launcher 30 is operable to carry and launch a plurality of pig elements 55 and 110 into the pipeline 2.

The compartment 108 includes a plurality of pig launching stations 112 behind each of which there is located an opening 114, 114', 114'' of a fluid conduit 116, 116', 116''. Compressed gas is supplied to each such conduit 116, 116', 116'' via a supply line 118 extending from a floating vessel 7. A master control unit 120 is provided to regulate the distribution of gas to the individual conduits 116. A hole in the shroud 104 renders the control panel 122 of the control unit accessible to manual operation by a diver (and, of course, the control unit could be remotely operated).

Wedge rings or detent means 124 (which may be annular or comprise one or more discrete segments) may be provided at each pig launching station 112 in order to retain the pig elements prior to launching. The rings 124 secure pigs in place until sufficient gas pressure acts on the pigs and causes them to deform and pass resiliently through the rings 124. The passage of the pigs through the rings in this manner will be accompanied by reductions in pressure of gas in conduit 118 which would be detectable at vessel 7 as an indication of pig launching.

The pig launcher 30 can be arranged to carry pig elements of various shapes and sizes. For example, as shown in FIG. 6, it may be desirable to locate a caliper, or gauging pig 110 ahead of one or more spherical, purging pigs 55.

Caliper pigs are well known in the art and are utilized to locate the presence of buckles in pipelines. The caliper pig 110 includes forward and rearward, truncated conical support rings 130 which are interconnected by an intermediate member 132. The support elements 130 each have an outer annular resilient edge that engages the inner pipeline wall so that the caliper pig displaces water when conveyed through a flooded pipeline. The caliper pig 110 will advance through the pipeline until it encounters a buckle in the pipeline which has gone previously undetected, and will then stop. A cessation of travel of the caliper pig will provide an indication that the section 2 is defective.

A disadvantage associated with some proposed pig launchers is their inability to provide a positive indication of a successful pig launching. While the gas pressure reduction previously noted may provide such an indication, the pig launcher 30 of the present invention may also include a telltale or tattletale line 138. The tattletale line comprises a fluid conduit having an inlet 140 disposed in the compartment 108 ahead of the pig elements to be launched and an outlet communicating with the main control unit 120. By suitable operation of the control unit 120, the tattletale line 138 can be placed in communication with a discharge line 142 to eject gas directly into the surrounding water. The resultant discharge of telltale bubbles 8 (FIG. 1) signifies a successful launching to an observer, such as a diver at the scene.

Passage of a single caliper pig element 110 or spherical purging pig element 55 through the flooded pipeline 2 serves to purge a significant amount of water therefrom. Not all of the water may be removed in a single pass, however, so there may remain in the pipeline significant residual water capable of hampering subsequent pipeline recovery efforts.

In accordance with the present invention, one or more follower purging pigs, preferably of the spherical type 55, can be sent through the pipeline to remove residual water. The follower pigs 55 are propelled from the launcher 30 by the ejection of pressurized gas from the fluid conduit (116', 116") located behind their respective launching stations 112. Launching of a follower pig could be delayed until the initially conveyed pig caliper 110 has reached the pig receiver 32. Alternatively, the follower pig could be launched subsequent to launching of the initial pig, but prior to its arrival at the pig receiver.

As will be appreciated, conduits 116, 116' and 116" may be connected by individual valves in control unit 120 with gas supply conduit 118. Similarly, conduit 138 may be connected via a valve in control unit 120 with conduit 142.

After a pig has been successfully launched, and passed tattletale inlet 140, the valve connecting line 138 and 142 may be closed. Similarly, after a pig has been received by the receiving unit 32, the valve associated with the respective propulsion conduit 116, 116' or 116" may be closed. (After the end 6 and unit 30 have been raised to vessel 7, such a valve may be opened prior to removal of unit 30 to vent the pressurized gas.)

Once the pipeline has been voided, the distal end 100 of the pipeline section 2 can be lifted onto a lay barge (as shown schematically in FIG. 2). This raising may be facilitated by use of a tensioned raising cable 144 extending to vessel 7. This operation may be preceded by removal of conduit 118 from unit 30 after the valves in control unit 120 have been closed. If desired, depressurization of the pipeline can be effected through suitable valving before removing the launcher 30 from the raised pipeline, as noted above. In any event, once the pig launcher is removed from the pipeline via detachable coupling 106, a new section of pipe is welded to the distal end of the pipeline and laying operations continue in the usual fashion.

The pig receiver 32 remains attached to the initial pipeline end 3 in the event that future dewatering or scanning operations are necessary.

Converticle Pig Launcher-Receiver

A further advantageous feature of the present invention resides in the fact that pig handling apparatus 32 is capable of functioning either as a launcher or as a receiver.

This is accomplished by utilizing the secondary fluid conduit system 64 of the receiver unit 32 as a gas inlet system for injecting pressurized gas behind a pig element to be launched.

In this connection, attention is directed to FIG. 5 which depicts a modified embodiment of pig receiver 32. In such embodiment, gas supply lines 150 (communicating with a vessel carried gas supply) are attached to the main manifold assembly 80. Manually and/or remotely operable shut-off valves 152 are provided in the supply lines 150. By successively communicating each of these gas supply lines 150 to a source of pressurized gas, and by successively opening the shut-off valves 152, pressurized gas can be supplied to successively launch pig elements located at the stations 54. It will be appreciated that in such instance, the primary fluid conduit system 66 or the conduit system 94 is operable to function as a tattletale line to signal a successful launch. After the pigs have left their sockets, driving gas can be supplied by way of the primary system.

The provision of identical launcher-receiver units at each pipeline end allows for convenient interchanging of parts. In addition, it is unnecessary to remove the conveyed pigs from the pig receiver. Rather, the unit could be re-used in a launching mode. Also, it will be apparent that if the convertible launcher-receiver unit becomes filled with pig elements prior to the completion of a laying operation, further dewatering operations can be conducted in a reverse manner, i.e., by using the convertible launcher-receiver at the initial pipeline end as a launcher.

Summary of Representative Repair Operation

A desirable initial step in utilizing the principles of the present invention occurs prior to commencement of the pipeline laying operation wherein a pig receiver 32 is attached to the initial pipeline end 3. Laying can then proceed in conventional fashion, wherein the end 3 of the pipeline is lowered (under control of draw cable 50), and the barge 7 is advanced while paying out the pipeline. Should a rupture or buckle be detected, laying operations immediately cease.

A vessel, which may be the lay barge, returns to the initial pipeline end 3 to install the submerged buoy 76 and a marker buoy 160 above the pig receiver 32 (FIG. 1). It will be appreciated that the distance between the initial end 3 and the "ruptured end" 6 of the pipeline could be substantial, depending upon the location of the rupture. Hence it may be desirable that a separate support vessel be employed to install the buoys 76 and 160 at the initial pipeline end.

At the ruptured end 6 of the pipeline, one or more divers is dispatched from a vessel to sever the segment 1 of the pipeline containing the rupture. A diver can operate from an underwater habitat which can be of the type disclosed in U.S. Pat. No. 3,802,427 to Banjavich et al, issued Apr. 9, 1974.

The pig containing launcher 30 is lowered to the waterbed (possibly via cable 144) and is installed onto the exposed distal end 6 of the pipeline section 2 (FIG. 2). The location of unit 30 may be marketed by a buoy 200 connected with unit 30 by a cable 202. The gas supply line 118 is connected between the pig launcher 30 and a suitable compressor on the vessel 7 either before or after the lowering of unit 30. By suitable actuation of the master control unit 122 of the launcher 30 (FIG. 6) (i.e., diver or remote operation), pressurized gas is supplied to the initial fluid supply conduit 116 to eject the first pig element, which may be in the form of a caliper pig 110.

Once the caliper pig 110, traveling under the influence of propulsion gas, has passed the inlet end 140 of the launcher tattletale line (FIG. 7), gas is ejected in significant amounts 8 into the surrounding water from the exhaust line 142. The resultant bubble formation 8 provides a positive indication that a successful launching has occurred (FIG. 1).

As the caliper pig 110 advances through the pipeline 2, it displaces water toward the initial end 3 of the pipeline. This displaced water is expelled into the body of water surrounding buoy 76 mainly through the primary fluid discharge conduit system 66, 74a. When this initial pig 110 enters the pig receiver 32 and passes the inlet 68 of the primary discharge conduit 66 and/or the inlet 96 of the receiver tattletale line 94, gas will be ejected into the surrounding water, establishing a bubble flow 9 indicative of pig arrival (FIG. 2) and displaced water will be ejected through the secondary discharge system of conduits 78, 80, 74b.

Upon entering its respective receiving station 54, the initial pig will be retained by a wedge ring 88.

While FIG. 3 dipicts the presence only of spherical purging pigs 55, it will be understood that a caliper pig 110 can be easily accommodated by one or more of the stations 54.

Either subsequent to, or prior to, the arrival of the initial pig within the pig receiver 32, a follower pig may be launched from the pig launcher 30 to displace residual water remaining in the pipeline. The follower pig is preferably in the form of a spherical purger pig 55 and is launched by gas supplied from the gas conduit 116'. An additional follower pig can be conveyed via gas from conduit 116" until the pipeline is sufficiently dewatered. Arrival of the follower pigs 55 at the receiver unit 32 will also result in the ejection of gas bubbles 9 (FIG. 2).

The distal end 6 of the pipeline 2 is then retrieved by a lay barge (which may also serve as vessel 7) with the pig launcher 30 remaining attached thereto. This retrieval operation will, of course, be greatly facilitated by the absence of significant amounts of water within the once-flooded pipeline 2. Once aboard the vessel, the pig launcher 30 is removed, the distal end 100 is reconnected with the continuing pipeline supply, and the laying operation resumes.

Upon completion of the laying operation (which may have involved multiple repair operations), the pig receiver 32 is separated from the initial pipeline end 3, with the pigs being conveniently nested inside.

It will be appreciated that within the purview of the present invention, a pig-containing launcher could be attached at the initially laid end of the pipeline. When a buckle occurs, a receiver could be attached at the ruptured pipeline end, and dewatering operations could be conducted as discussed previously, only in a reverse direction.

SUMMARY OF MAJOR ADVANTAGES AND SCOPE OF THE INVENTION

By virtue of the present invention, a submerged pipeline can be effectively purged of liquid, even though both ends of the pipeline remain submerged during the purging operation. In providing for the launching and reception of a plurality of pig elements, the present invention achieves removal from the pipeline of much or most of the residual liquid that could remain after the projection of a single pig through the pipeline.

The arrangement whereby propulsion gas is discharged into the ambient water during launching and reception of a pig element provides an effective, yet mechanically simple, visual indication system for monitoring the progress of the purging operation.

The primary and secondary exhaust systems of the pig receiver unit enable multiple pigs to be sequentially transported and received with optimum efficiency.

The pig receiver unit is capable of receiving and storing a number of pig elements. Consequently, the pig receiver unit is capable of storing pig elements during a series of purging or repair or scanning operations. Also, at the conclusion of the laying operation, the pig elements are easily recoverable by merely removing the detachable pig receiver unit in which the pig elements are conveniently nested.

A significant advantage is believed to reside in having the valves in the receiver unit 32 remotely controlled by a diver, located at less than deep water depths, i.e., possibly at buoy 76. This control system advantageously avoids the necessity of "saturation" or deep water diving.

Significance is also attached to the use of the detent means 124 in the sense that they serve to generate a detectable reduction in propulsion pressure when the pig moves through, and frees itself of, the restraining influence of the restraining means 124. The detent or restraining means 124 thus serve the unique dual function of affirmatively locating the pig elements and restraining them in appropriate launching stations 112 while enabling an indication of successful launching to be provided.

Moreover, it will be recognized that the system presented through this invention is not dependent upon partial purging of a pipeline or the necessity of calculating displacement volumes of gas to determine the partial length of a pipeline section to be purged. Moreover, the present invention does not disadvantageously position pigs within the interior of the pipeline at the end of a purging operation, as does prior art exemplified, for example, by the earlier noted U.S. Pat. No. 3,751,932 to Matthews.

The principles of the present invention can be utilized to provide a pig handling unit that is capable of functioning both as a pig launcher unit and a pig receiver unit, thereby facilitating operations and enabling purging procedures to be carried out in opposite directions.

The pig launching and receiving units, in being constructed of inner and outer housing members, provide a compact, yet structurally sound and protected underwater unit.

As will be apparent, aspects of the invention may be employed in scanning and/or repair operations. The unit 32 may be installed on a vessel or at the submerged site of pipeline end 3. Pigs may be launched with unit 30 being submerged or on a vessel. And the exhaust and gas supply systems may be diver operated or remotely controlled. (However, remote control of receiver 32 at buoy 76 is particularly advantageous since the need for deeper diving is avoided.) Moreover, the invention is not limited to scanning and/or repair operations which are a part of pipeline laying operations nor does the successful use of the invention necessitate complete water purging of pipelines.

Although the invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. Pipeline purging apparatus for passing pipeline pigs from a first pipeline means end to a second, submerged pipeline means end, said apparatus comprising:
    pig launcher means attached to said pipeline means at said first pipeline means end, said pig launcher means including
        first compartment means containing at least one pig element, and
        means for injecting pressurized gas behind said pig element to propel said pig element through said pipeline means toward said second pipeline means end; and
    said first compartment means of said pig launcher means including first pig element restraining, detent means,
        said first detent means being operable to releasably secure a said pig element within said first compartment means;
    means, including said first detent means, responsive to the passage of a pig element past said first detent means to generate a detectable reduction in pressure of said pressurized gas;
    pig receiver means attached to said pipeline means at said second, submerged pipeline means end, said pig receiver means including
        means for exhausting fluid displaced by said pig element, and
        second compartment means for receiving said propelled pig element;
    said compartment means of said pig receiver means including second, pig element restraining, detent means,
        said second detent means being operable to releasably secure a said pig element within said second compartment means;
    said apparatus including detachable connecting means detachably connecting said pig receiver means to said second end of said submerged pipeline means;
    said detachable connecting means being operable to permit the concurrent removal of said pig receiver means, and at least one pig element secured in said compartment means by said second detent means, from said second end of said submerged pipeline means; and
    retrieving means operable from the surface of a body of water within which said pig receiver means is submerged, to raise said pig receiver means, including said at least one pig element, to said surface.

2. Apparatus according to claim 1:
    wherein said pig receiver means is detachably connected to an initially laid end of said pipeline means comprising said second, submerged pipeline means end;
    wherein said second compartment means includes means for receiving and storing a plurality of pig elements; and
    wherein said pig launcher means is attached to a subsequent portion of said pipeline means comprising said first pipeline means end and includes means for storing and sequentially propelling a plurality of pig elements into said pipeline means.

3. Apparatus according to claim 1 wherein said pig receiver means includes
    means for exhausting a portion of said pressurized, pig element propelling gas into the ambient water to indicate arrival of said pig element within said pig receiver means.

4. Pipeline purging apparatus for purging liquid from a submerged pipeline, the pipeline including a first submerged end and a second submerged end, said purging apparatus comprising:
    pig launcher means at said first pipeline end, said pig launcher means
        containing a plurality of pig elements, and
        including pressurized gas ejecting means for sequentially propelling said pig elements into said pipeline and toward said second pipeline end;
    pig receiver means at said second pipeline end including
        an outer shroud,
        a tube arranged within said shroud, and
        chamber means defined between said shroud and said tube,
        compartment means in said tube having at least two pig receiving stations operable to receive pig elements advanced by said launcher means,
        primary fluid discharge means in said chamber means having an inlet means communicating with said compartment means between said stations and said pipeline and operable to exhaust from said compartment means a first charge of liquid displaced by an advancing pig, and
        secondary fluid discharge means in said chamber means including inlet means operable to exhaust a second charge of liquid displaced by said advancing pig subsequent to travel of said advancing pig past said inlet means of said primary fluid discharge means, whereupon propulsion gas is exhausted through said primary fluid discharge means.

5. Apparatus according to claim 4 wherein said second fluid discharge means
includes a plurality of separate inlet means, each communicating with a respective pig receiving station.

6. Apparatus according to claim 5 wherein said primary and secondary fluid discharge means each includes
valve means for regulating the exhaust of liquid therethrough.

7. Apparatus according to claim 4 wherein said primary fluid discharge means of said pig receiver means is arranged to exhaust fluid directly into the ambient water, with the exhausting of propulsion gas therefrom signalling the arrival of said pig element within said pig receiver means.

8. Apparatus according to claim 4 wherein said launcher means includes
gas discharge means for exhausting propulsion gas directly into the ambient water in response to predetermined advancement of a pig element being launched.

9. A pig receiver for use in combination with a pipeline having first and second submerged ends, wherein at least one pig element is to be advanced through said pipeline from said first end toward said second end to purge liquid located in said pipeline, said pig receiver comprising:
housing means connectable to the said second submerged pipeline end,
said housing means including compartment means communicating with said pipeline and being operable to receive a pig element conveyed from said first pipeline end;
primary fluid discharge means having an inlet communicating said compartment means with the ambient water to sequentially exhaust
liquid displaced by an advancing pig element, and pressurized propulsion gas behind said advancing pig element to indicate the arrival of said pig element in said pig receiver,
said housing means including detent means located internally thereof,
said detent means being operable to releasably secure a said pig element within said compartment means; and
detachable connecting means detachably connecting said housing means to said second end of said pipeline;
said detachable connecting means being operable to permit the concurrent removal of said housing means, and at least one pig element secured in said compartment means by said detent means, from said second end of said pipeline; and
retrieving means operable from the surface of a body of water within which said housing means is submerged, to raise said housing means, including said at least one pig element, to said surface.

10. Apparatus according to claim 9 wherein said pig receiver further includes
secondary fluid discharge means having inlet means operable to exhaust liquid displaced by said advancing pig element while pressurized gas is exhausted through said primary fluid discharge means.

11. Apparatus according to claim 10 wherein said compartment means includes:
a plurality of stations operable to sequentially receive a plurality of pig elements, and
said inlet means of said secondary fluid discharge means comprises a plurality of inlets, each communicating with one of said stations.

12. Pig launcher apparatus for sequentially launching a plurality of pigs into one end of a submerged flooded pipeline to displace liquid from the other pipeline end, said launcher apparatus comprising:
housing means connectable with said one submerged pipeline end, said housing means including compartment means,
said compartment means being communicable with said pipeline when said housing means is attached to said pipeline, and including a plurality of pig receiving stations;
first fluid conducting means having a plurality of outlets, each communicating with one of said stations,
said first fluid conducting means being communicable with a source of pressurized gas and being operable to introduce pressurized gas to successive ones of said stations to sequentially propel said pigs into said pipeline; and
second fluid conducting means having
an inlet located between said pig receiving stations and an end of said housing means connected with said pipeline,
said second fluid conducting means being arranged to exhaust pressurized gas into the ambient water when said gas-propelled pig has travelled past said inlet of said second fluid conducting means, to indicate the launching of said pig element;
said housing means including detent means located internally thereof,
said detent means being operable to releasably secure a said pig within said compartment means; and
means, including said detent means, responsive to the passage of a said pig past said detent means to generate a detectable reduction in pressure of said pressurized gas.

13. A convertible pig handling unit which is operable in submerged pipeline purging operations as a pig launcher for sequentially advancing a plurality of pig elements into one submerged end of said pipeline and as a pig receiver for receiving a plurality of pig elements from another submerged end of said pipeline after said pig elements have been advanced through said pipeline, said pig handling unit comprising:
housing means connectable at a pipeline connecting end with a pipeline, said housing means containing compartment means therein;
said compartment means being communicable with said pipeline when said pig handling unit is connected thereto, and including a plurality of pig reception stations;
first fluid conduit means having an inlet communicating with said compartment means at a location disposed between said pig reception stations and said pipeline connecting end of said housing means, said first fluid conduit means being arranged to:

exhaust from said compartment means fluid that has been displaced by an advancing pig when said pig handling unit is operable as a pig receiver, and exhaust pressurized gas from said compartment means into the ambient water, in response to a gas-launched pig having travelled past said inlet, so as to indicate a successful launching when said pig handling unit is operable as a pig launcher; and a plurality of second fluid conduit means communicating with said compartment means at locations disposed adjacent respective ones of said stations, said second fluid conduit means being arranged to:

selectively exhaust from said compartment means liquid which has been displaced by advancing pig elements when said handling unit is operable as a pig receiver, and selectively introduce pressurized gas behind said pig elements to sequentially launch said pig elements into the submerged pipeline when said handling unit is operable as a pig launcher.

14. Apparatus according to claim 13 wherein said housing means comprises an outer shroud and an inner tube arranged therein and spaced therefrom to define a chamber containing said first fluid conduit means and said second fluid conduit means; and wherein said compartment means is disposed in said inner tube.

15. A method for passing pipeline pigs through pipeline means submerged, at least in part, in a body of water, sad method comprising:

providing pig launcher means attached at a first end of said pipeline means and including a pig element;

providing submerged pig receiver means attached at a second submerged end of said pipeline means;

providing compartment means in both said pig launcher means and said pig receiver means which are in communication with the interior of said pipeline means;

injecting pressurized gas behind said pig element contained within said compartment means of said pig launcher means to propel said pig element into said pipeline means toward said submerged pig receiver means;

receiving and storing said propelled pig element in said compartment means of said pig receiver means;

providing detent means in said compartment means of each of said pig launcher means and said pig receiver means, said detent means being operable to releasably secure a said pig element;

generating a detectable reduction in pressure of said pressurized gas in response to movement of a said pig element past said detent means of said pig launcher means;

providing detachable connecting means detechably connecting said pig receiver means to said second end of said pipeline means;

said detachable connecting means being operable to permit the concurrent removal of said pig receiver means, and at least one pig element secured in said compartment means of said pig receiver means by said detent means thereof, from said second end of said pipeline means; and providing retrieving means operable from the surface of a body of water within which said pig receiver means is submerged, to raise said pig receiver means, including said at least one pig element, to said surface and operating said retrieving means to so raise said pig receiver means.

16. A method for purging liquid from a pipeline means submerged in a body of water comprising the steps of:

providing pig launcher means attached at a first submerged end of said pipeline means and including a pig element;

providing submerged pig receiver means attached at a second submerged end of said pipeline means;

providing compartment means in both said pig launcher means and said pig receiver means which are in communication with the interior of said pipeline means;

injecting pressurized gas behind a pig element contained within said compartment means of said pig launcher means to propel said pig element into said pipeline means and displace liquid toward said submerged pig receiver means;

exhausting from said pig receiver means liquid displaced by said pig element;

receiving and storing said propelled pig element in said compartment means of said pig receiver means;

providing detent means in said compartment means of each of said pig launcher means and said pig receiver means, said detent means being operable to releasably secure a said pig element;

generating a detachable reduction in pressure of said pressurized gas in response to movement of a said pig element past said detent means of said pig launcher means;

providing detechable connection means detechably connecting said pig receiver means to said second end of said pipeline means;

said detachable connecting means being operable to permit the concurrent removal of said pig receiver means, and at least one pig element secured in said compartment means of said pig receiver means by said detent means thereof, from said second end of said pipeline means; and providing retrieving means operable from the surface of a body of water within which said pig receiver means is submerged, to raise said pig receiver means, including said at least one pig element, to said surface and operating said retrieving means to so raise said pig receiver means.

17. A pipeline purging system for passing pipeline pigs from a first pipeline means end to a second, submerged pipeline means end, said system comprising:

pig launcher means attached to said pipeline means at said first pipeline means end, said pig laucher means including first compartment means containing a plurality of pig elements, means for sequentially injecting pressurized gas behind said pig elements to sequentially propel said pig elements through said pipeline means toward said second pipeline means end, and means operable to indicate the propulsion of said pig elements from said compartment means;

submerged pig receiver means attached to said pipeline means at said second, submerged pipeline means end, said submerged pig receiver means including means for exhausting fluid displaced by said pig elements, second compartment means for sequentially receiving said propelled pig elements, means operable to indicate the reception of said pig elements by said pig receiver means;

said first and second compartment means each including a plurality of pig element restraining, detents, said detents of each of said first and second compartment means being operable to releasably secure a plurality of said pig elements;

detachable connecting means detachably connecting said pig receiver means to said second end of said submerged pipeline means;

said detachable connecting means being operable to permit the concurrent removal of said pig receiver means, and at least one pig element secured in said second compartment means by a said detent of said second compartment means, from said second end of said submerged pipeline means; and retrieving means operable from the surface of a body of water within which said pig receiver means is submerged, to raise said pig receiver means, including said at least one pig element, to said surface.

18. A method for passing pipeline pigs through a pipeline means system submerged, at least in part, in a body of water, said method comprising:

providing pig launcher means attached at a first end of said pipeline means and containing a plurality of pig elements;

providing submerged pig receiver means attached at a second submerged end of said pipeline means;

providing compartment means in both said pig launcher means and said pig receiver means which are in communication with the interior of said pipeline means;

sequentially injecting pressurized gas behind said plurality of pig elements contained within said compartment means of said pig launcher means to sequentially propel said plurality of pig elements into said pipeline means toward said pig receiver means;

indicating the propulsion of said plurality of pig elements from said compartment means of said pig launcher means;

receiving and storing said plurality of propelled pig elements in said compartment means of said pig receiver means;

indicating the receiving of said plurality of propelled pig elements in said compartment means of said pig receiver means;

providing in said compartment means of each of said pig launcher means and said pig receiver means a plurality of pig element restraining detents said detents of said compartment means of each of said pig launcher means and said pig receiver means being operable to releasably secure a plurality of said pig elements;

providing detachable connecting means detachably connecting said pig receiver means to said second end of said submerged pipeline means;

said detachable connecting means being operable to permit the concurrent removal of said pig receiver means, and at least one pig element secured in the compartment means thereof by a said detent, from said second end of said submerged pipeline means; and providing retrieving means operable from the surface of a body of water within which said pig receiver means is submerged, to raise said pig receiver means, including said at least one pig element, to said surface, and operating said retrieving means to so raise said pig receiver means.

19. Pipeline purging apparatus for passing pipeline pigs from a first pipeline means end to a second, submerged pipeline means end, said apparatus comprising:

pig launcher means attached to said pipeline means at said first pipeline means end, said pig launcher means including first compartment means containing at least one pig element, and means for injecting pressurized gas behind said pig element to propel said pig element through said pipeline means toward said second pipeline means end; and pig receiver means attached to said pipeline means at said second, submerged pipeline means end, said pig receiver means including means for exhausting fluid displaced by said pig element, second compartment means for receiving said propelled pig element, and means detachably connecting said pig receiving means with said pipeline to permit the concurrent removal of said pig receiving means and a pig element from said pipeline means;

said pig receiver means including means for exhausting a portion of said pressurized, pig element propelling gas into the ambient water to indicate arrival of said pig element within said pig receiver means; and said pig launcher means including means for exhausting pressurized, pig element propelling gas into the ambient water in response to advancement of a pig element being launched.

20. Pipeline purging apparatus for passing pipeline pigs from a first pipeline means end to a second, submerged pipeline means end, said apparatus comprising:

pig launcher means attached to said pipeline means at said first pipeline means end, said pig launcher means including first compartment means containing at least one pig element, and means for injecting pressurized gas behind said pig element to propel said pig element through said pipeline means toward said second pipeline means end; and pig receiver means attached to said pipeline means at said second, submerged pipeline means end, said pig receiver means including means for exhausting fluid displaced by said pig element, second compartment means for receiving said propelled pig element, and means detachably connecting said pig receiving means with said pipeline to permit the concurrent removal of said pig receiving means and a pig element from said pipeline means;

said pig receiver means and said pig launcher means each including
a shroud, and
a tube arranged within said shroud and being spaced inwardly therefrom to define a chamber,
said first compartment means of said pig launcher means being located in said tube of said launcher means, and
said second compartment means of said pig receiver means being located in said tube of said pig receiver means.

21. A pig receiver for use in combination with a pipeline having first and second submerged ends, wherein at least one pig element is to be advanced through said pipeline from said first end toward said second end to purge liquid located in said pipeline, said pig receiver comprising:
housing means connectable to the said second submerged pipeline end,
said housing means including compartment means communicating with said pipeline and being operable to receive a pig element conveyed from said first pipeline end;
primary fluid discharge means having an inlet communicating said compartment means with the ambient water to sequentially exhaust liquid displaced by an advancing pig element, and
pressurized propulsion gas behind said advancing pig element to indicate the arrival of said pig element in said pig receiver; and
secondary fluid discharge means having inlet means operable to exhaust liquid displaced by said advancing pig element while pressurized gas is exhausted through said primary fluid discharge means;
said housing means including
an outer shroud, and
an inner tube disposed therein and spaced therefrom to define a chamber containing said primary discharge means and said secondary discharge means,
said compartment means being disposed in said inner tube.

22. Pig launcher apparatus for sequentially launching a plurality of pigs into one end of a submerged flooded piepline to displace liquid from the other pipeline end, said launcher apparatus comprising:
housing means connectable with said one submerged pipeline end, said housing means including compartment means,
said compartment means being communicable with said pipeline when said housing means is attached to said pipeline, and including a plurality of pig receiving stations;
first fluid conducting means having a plurality of outlets, each communicating with one of said stations,
said first fluid conducting means bieng communicable with a source of pressurized gas and being operable to introduce pressurized gas to successive ones of said stations to sequentially propel said pigs into said pipeline; and
second fluid conducting means having
an inlet located between said pig receiving stations and an end of said housing means connected with said pipeline,
said second fluid conducting means being arranged to exhaust pressurized gas into the ambient water when said gas-propelled pig has travelled past said inlet of said second fluid conducting means, to indicate the launching of said pig element;
said housing means including
an outer shroud,
an inner tube arranged therein, and
a chamber defined between said outer shroud and said inner tube containing said first and second fluid conducting means.

23. A method for purging liquid from a pipeline means submerged in a body of water comprising the steps of:
providing pig launcher means attached at a first submerged end of said pipeline means and including a pig element;
providing submerged pig receiver means attached at a second submerged end of said pipeline means;
providing compartment means in both said pig launcher means and said pig receiver means which are in communication with the interior of said pipeline means;
injecting pressurized gas behind a pig element contained within said compartment means of said pig launcher means to propel said pig element into said pipeline means and displace liquid toward said submerged pig receiver means;
exhausting from said pig receiver means liquid displaced by said pig element;
receiving and storing said propelled pig element in said compartment means of said pig receiver means; and
exhausting from said pig receiver means a portion of said pressurized gas into the ambient water subsequent to reception of said pig element within said pig receiver means to indicate reception of said pig element.

24. A method according to claim 23 further including the step of
exhausting from said pig launcher means a portion of said pressurized gas into the ambient water to indicate a launching of said pig element.

25. A method according to claim 23 wherein
said step of injecting pressurized gas further comprises
injecting pressurized gas selectively behind a plurality of pig elements to sequentially propel said pig elements into said pipeline means;
said step of exhausting further comprises
exhausting liquid displaced by each of said pig elements, and
said step of receiving further comprises
sequentially receiving and storing a plurality of said propelled pig elements in said compartment means of said pig receiver means.

26. A method according to claim 25 wherein
said step of exhausting further comprises
exhausting displaced liquid through primary fluid discharge means; and
said step of receiving and storing further comprises
subsequent to reception of said pig elements within said pig receiving means, exhausting displaced liquid through secondary fluid discharge means while simultaneously exhausting propulsion gas through said primary fluid discharge means.

27. A method according to claim 26 further including the step of restricting the exhausting liquid from said pig receiver means as said pig element has moved past said primary fluid discharge means.

28. A method according to claim 23 wherein said steps of providing pig launcher means and pig receiver means comprise attaching said pig receiver means to an initial end of said pipeline means prior to laying said first submerged end into the body of water, and attaching said pig launcher unit to a distal, other end of said pipeline.

* * * * *